United States Patent
Gopalarathnam

(10) Patent No.: US 9,912,544 B2
(45) Date of Patent: Mar. 6, 2018

(54) SYSTEM AND METHOD FOR MASTER SWITCH ELECTION

(71) Applicant: Dell Products L.P., Round Rock, TX (US)

(72) Inventor: Sudharsan Dhamal Gopalarathnam, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 54 days.

(21) Appl. No.: 14/526,142

(22) Filed: Oct. 28, 2014

(65) Prior Publication Data

US 2016/0119183 A1    Apr. 28, 2016

(51) Int. Cl.
*H04L 12/24*    (2006.01)
*H04L 12/931*   (2013.01)
*H04L 12/775*   (2013.01)

(52) U.S. Cl.
CPC .............. *H04L 41/12* (2013.01); *H04L 41/30* (2013.01); *H04L 45/583* (2013.01); *H04L 49/351* (2013.01)

(58) Field of Classification Search
CPC ..... H04J 3/0641; H04J 3/0658; H04L 12/403; H04L 41/082; H04L 41/0213; H04L 41/0654; H04L 45/00; H04L 45/28; H04L 45/245; H04L 45/583; H04L 47/10; H04L 49/25; H04L 49/205; H04L 49/351; H04L 49/602; Y02B 60/33
See application file for complete search history.

(56) References Cited

U.S. PATENT DOCUMENTS

| | | | | |
|---|---|---|---|---|
| 2002/0046271 A1* | 4/2002 | Huang | .................... | H04L 45/00 709/223 |
| 2006/0092849 A1* | 5/2006 | Santoso | ................ | H04L 45/583 370/244 |
| 2007/0081463 A1* | 4/2007 | Bohra | ................... | H04L 45/583 370/235 |
| 2008/0205418 A1* | 8/2008 | Rose | ....................... | H04L 12/42 370/401 |
| 2008/0275975 A1* | 11/2008 | Pandey | ................... | H04L 49/70 709/223 |
| 2010/0284414 A1* | 11/2010 | Agarwal | ............... | H04L 49/351 370/401 |

* cited by examiner

*Primary Examiner* — Walter Divito
*Assistant Examiner* — Dharmesh Patel
(74) *Attorney, Agent, or Firm* — Haynes and Boone, LLP

(57) ABSTRACT

A system and method for electing a master switch includes a management port for coupling a first switch to a management system, a plurality of stacking ports for coupling the first switch to other switches in a stacked switch, and a control unit. The control unit detects one or more first connectivity settings of the management port, exchanges the first connectivity settings with the other switches using at least one of the stacking ports, exchanges second connectivity settings for the other switches using the stacking ports, and elects a master switch for the stacked switch based on the first and second connectivity settings. In some embodiments, the control unit further receives a first management configuration from the management system, exchanges the first management configuration with the other switches, exchanges second management configurations of the other switches, and further elects the master switch based on the first and second management configurations.

19 Claims, 3 Drawing Sheets

SYSTEM AND METHOD FOR MASTER SWITCH ELECTION

BACKGROUND

The present disclosure relates generally to information handling systems, and more particularly to master switch election.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often used to continuously make forwarding decisions and to update forwarding information as network configurations change. To provide redundancy and/or support scalability in the network, two or more network switching products in a network may cooperate to act as a single network switching entity. In some examples, two or more network switching products may be configured as a stacked network switching product, where the stacked network switching products have characteristics of a single network switching product, but have the port capacity of the sum of the port capacities of each of the stacked network switching products. In many implementations, one of the stacked network switching products is elected as the master for the stack and then typically assumes greater management responsibility for the entire stack. For example, the master switch may become responsible for handling management traffic for the entire stack. Several approaches for electing the master switch have been developed over the years, but they don't always do the best job of selecting the master switch from among the stacked network switching products in the stack.

Accordingly, it would be desirable to provide improved methods and systems for electing a master switch for a stack of network switching products.

SUMMARY

According to one embodiment, a network switching device includes a management port for coupling the device to a management system, a plurality of stacking ports for coupling the device to other network switching devices in a stacked switch, and a control unit coupled to the management port and the stacking ports. The control unit detects one or more first connectivity settings of the management port, exchanges the first connectivity settings with the other network switching devices using at least one of the stacking ports, exchanges second connectivity settings for the other network switching devices using the stacking ports, and elects a master network switching device for the stacked switch based on the exchanged first and second connectivity settings.

According to another embodiment, a method of electing a master network switching device includes detecting one or more first connectivity settings of a management port, exchanging the first connectivity settings with other network switching devices in a stacked switch using at least one of a plurality of stacking ports, exchanging second connectivity settings for the other network switching devices using the stacking ports, and electing a master network switching device for the stacked switch based on the exchanged first and second connectivity settings. The management port couples a first network switching device to a management system. The stacking ports couple the first network switching device to the other network switching devices. The first connectivity settings include one or more selected from a group consisting of presence of a management port connection, connection speed, and duplex setting.

According to yet another embodiment, an information handling system includes a stacked switch. The stacked switch includes a plurality of network switching devices. Each of the network switching devices comprises a management port for coupling the network switching device to a management system, a plurality of stacking ports for coupling the network switching device to others of the network switching devices in the stacked switch, and a control unit coupled to the management port and the stacking ports. The control unit detects one or more first connectivity settings of the management port, exchanges the first connectivity settings with the other network switching devices in the stacked switch using at least one of the stacking ports, exchanges second connectivity settings for the other network switching devices in the stacked switch using the stacking ports, and elects a master network switching device for the stacked switch based on the exchanged first and second connectivity settings. The first connectivity settings include one or more selected from a group consisting of presence of a management port connection, connection speed, and duplex setting.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
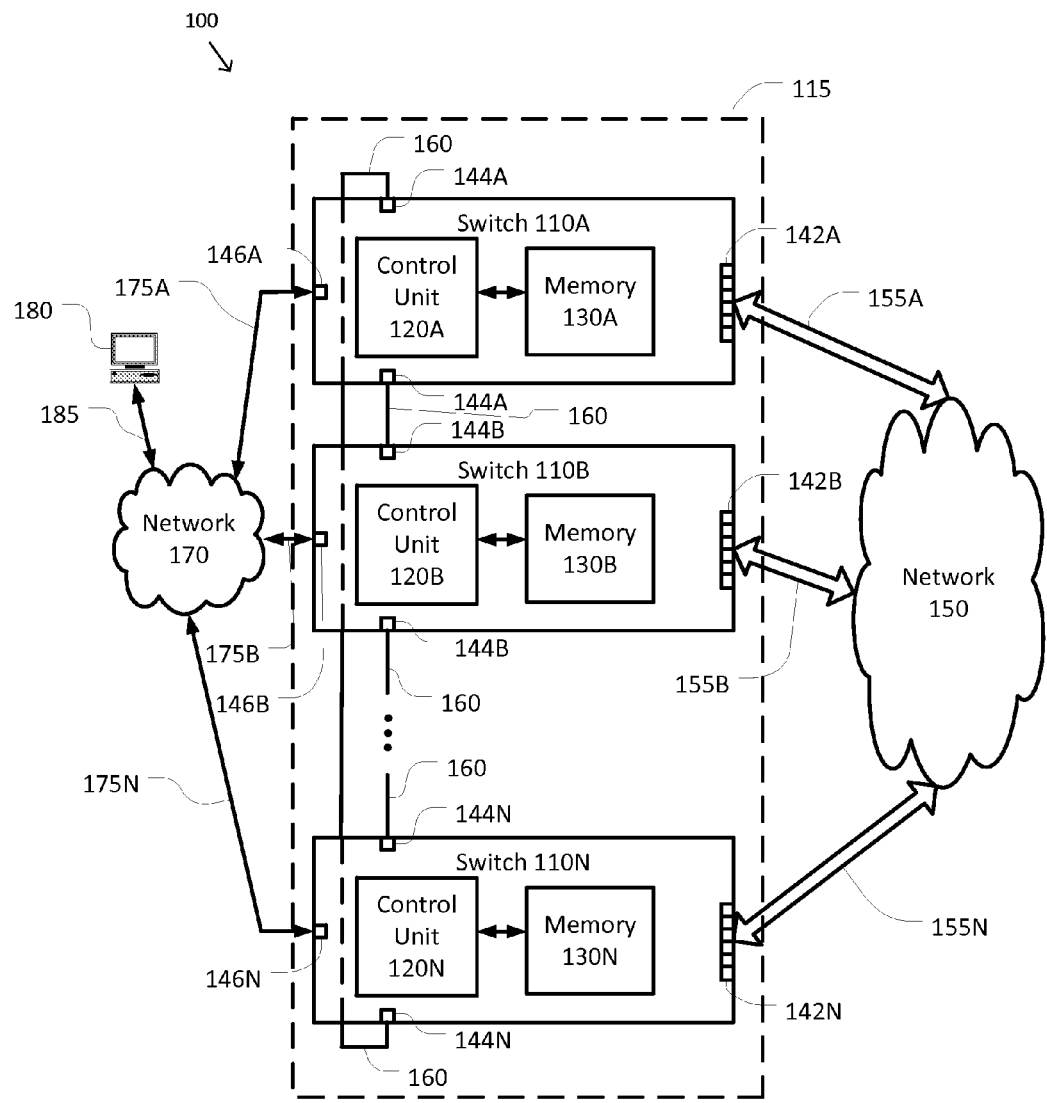
FIG. 1 is a simplified diagram of a networked computing system according to some embodiments.

FIG. 1 is a simplified diagram of a networked computing system 100 according to some embodiments. As shown in FIG. 1, computing system 100 includes several network switching devices 110A, 110B, . . . , 110N (generically 110) arranged as a stacked switch 115. And, although only three network switching devices 110A, 110B, and 110N are shown in FIG. 1, one of ordinary skill would understand that stacked switch 115 may include any number of network switching devices of various types and/or capabilities. In some embodiments, network switching devices 110 may be any type of network switching device including switches, routers, hubs, bridges, and/or the like.

As shown in FIG. 1, network switching device or switch 110A includes a control unit 120A coupled to memory 130A. Control unit 120A may control the operation of switch 110A. In some examples, control unit 120A may make forwarding decisions for network traffic received at switch 120A that is to be forwarded on to other devices in computing system 100. As such, control unit 120A and switch 110A may exchange network traffic with the other devices using one or more networking protocols. In some examples, control unit 120A may include one or more processors, central processing units, virtual machines, microprocessors, microcontrollers, application specific integrated circuits (ASICs), field programmable gate arrays (FPGAs), and/or the like.

Memory 130A may be used to store one or more applications and one or more data structures, which are used by switch 110A and/or control unit 120A. In some examples, memory 130A may include one or more forwarding data structures, such as tables, and/or one or more management data structures for use by switch 110A and/or control unit 120A to support the forwarding of network traffic by switch 110A and/or the operation of switch 110A. In some examples, these data structures may include one or more virtual LAN tables, link aggregation group (LAG) tables, layer 2 (L2) next hop tables, layer 3 (L3) routing tables, L3 forwarding information bases (FIBs), flow tables, and/or the like. Memory 130A may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

In order to communicate with the other devices in computing system 100, switch 110A includes a plurality of ports which may couple switch 110A to other switches, devices, and/or networks using corresponding network links. As shown in FIG. 1, switch 110A includes ports used for three purposes including one or more general traffic ports 142A, one or more stacking ports 144A, and one or more management ports 146A.

General traffic ports 142A are used by switch 110A to support the forwarding of network traffic between and among other devices in computing system 100 as shown generally by a network 150. In some examples, the general traffic ports 142A may be referred to as front-end ports. Each of the general traffic ports 142A may be coupled via a respective network link 155A to network 150 where they are coupled to other network switching devices, servers, computers, user devices, and/or the like. In some examples, network 150 may be any kind of network including a wireless network, a local area network (LAN) such as an Ethernet, and/or a wide area network (WAN) such as an internet. In some examples, each of the network links 155A may be any type of network link including an Ethernet cable, a wireless connection, an ATM link, and/or the like.

Stacking ports 144A may be used by switch 110A to support the forwarding of network, management, and/or stacking protocol traffic among the switches 110A-110N in stacked switch 115. As shown in FIG. 1, stacking ports 144A of switch 110A are coupled to corresponding stacking ports (e.g., stacking ports 144B and 144N) of the other switches 110B-110N in stacked switch 115 via corresponding network links 160. In some examples, network traffic received on one of the general traffic ports 142A from a part of network 150 may be forwarded via one of the stacking ports 144A to another of the switches 110B-110N before the network traffic is forwarded along towards its final destination through another part of network 150. In some examples, management traffic and/or stacking protocol traffic may be exchanged between and among switches 110A-110N using stacking ports 144 and network links 160. In some examples, each of the network links 160 may be any type of network link including an Ethernet cable, a wireless connection, an ATM link, and/or the like.

Management ports 146A may be used by switch 110A to exchange management traffic used to configure and/or provision one or more of the switches 110A-110N and/or report on status of one or more of the switches 110A-110N. Each of the management ports 146A may be coupled to a management system, such as a management network 170, via a respective network link 175A. In some examples, network 170 may be any kind of network including a cable, a wireless link, a wireless network, a local area network (LAN) such as an Ethernet, and/or a wide area network (WAN) such as an internet. In some examples, each of the network links 175A may be any type of network link including a USB cable, a wireless link, a Bluetooth link, an Ethernet cable, a wireless connection, an ATM link, and/or the like. In some examples, network 170 and/or network link 175A may be used to couple switch 110A to one or more servers and/or management consoles such as shown by a representative management console 180 coupled to management network 170 via network link 185. In some examples, network link 175A and network link 185 may be a same network link so that management console 180 is coupled to switch 110A without any intervening management network 170. In some examples, network 170, network link 175A, and network link 185 may be used to exchange the management traffic between management console 180 and switch 110A. In some examples, management console 180 may be used to display the management information to a network manager and/or receive configuration and/or provisioning instructions from the network manager to be sent to switch 110A.

According to some embodiments, each of the different kinds of ports (general traffic ports 142A, stacking ports 144A, and/or management ports 146A) may be ports dedicated for their specific purpose or may be general ports that may be configurable depending upon their purpose. In some examples, stacking ports 144A and/or management ports 146A may have different characteristics from general traffic ports 142A. In some examples, the characteristics may include interface type, port speed, and/or the like. In some examples, stacking ports 144A may have higher port speed than some of the general traffic ports 142 and/or management ports 146A. In some examples, the general traffic ports 142A, stacking ports 144A, and/or management ports 146A may be determined based on configuration and/or provisioning information provided to switch 110A by an network manager, a server, and/or other mechanism. In some examples, the general traffic ports 142A, stacking ports 144A, and/or management ports 146A may be determined based on types, protocols, and/or content of various messages received and/or exchanged on a respective port.

According to some embodiments, switch 110A may be considered representative of the other switches 110B-110N in stacked switch 115. In some examples, the other switches 110B-110N may include similar structures, characteristics, connectivity, and/or capabilities as switch 110A. In some examples, switches 110A-110N may be of the same model and type and/or may be of one or more different models and/or types. In some examples, each of the various models and/or types may include the general structure, characteristics, connectivity, and/or capabilities of switch 110A, but may differ in terms of processing capability, memory size, memory type, number of ports, port speeds, types of network link, and/or the like.

Collectively, switches 110A-110N may be configured to function as stacked switch 115. In this configuration, switches 110A-110N may appear to be a single switching device (i.e., stacked switch 115) to the other devices located in and/or coupled to network 150. In other words, a first device coupled via one of the network links 155N to one of the general traffic ports 142N of switch 110N may appear to be effectively coupled to the same switching device as a second device coupled via one of the network links 155B to one of the general traffic ports 142B of switch 110B. In order to support this, switches 110A-110N are coupled together and exchange management and other network traffic forwarding information between and among each other. Switches 110A-110N also exchange forwarded traffic between each other so that network traffic forwarded to any of the switches 110A-110N may be forwarded to its destination using an appropriate one of the network links 155 even though the network traffic may be first received by a different one of the switches 110A-110N. In some examples, the stacking ports 144 and network links 160 may be used to exchange the management information, network traffic forwarding information, and/or the forwarded network traffic between switches 110A-110N.

The switches in a stacked switch are typically coupled together using their stacking ports in a regular topology. As shown in FIG. 1, switches 110A-110N are coupled together in a daisy-chain and/or ring topology. Switch 110A is coupled via at least one of its stacking ports 144A to corresponding stacking ports 144B of switch 110B via corresponding network links 160. Switch 110B is then coupled via at least one of its other stacking ports 144B to another switch 110 (not shown) in stacked switch 115. Eventually, the chain of switches 110 may form a closed ring where switch 110N is coupled via at least one of its stacking ports 144N to corresponding stacking ports 144A of switch 110A via corresponding network links 160. In some examples, the use of a daisy chain and/or ring topology may provide for simple rules for the forwarding of packets associated with the management information, network traffic forwarding information, and/or network traffic between switches 110A-110N. In some examples, the packets may be forwarded in a single direction around the ring such as from 110A to 110B all the way to 110N and then back to 110A or from 110A to 110N all the way to 110B and then back up to 110A. In some examples, the direction of the packets may be reversed to address a failure in network links 160 or in the stacking ports 144. In some examples, the packets may be forwarded in either of the directions around the ring, perhaps based on which direction is the shortest between where a packet enters the ring and where the packet exits the ring. In some examples, the management information and/or network forwarding information may be forwarded to each of the switches 110A-110N in the ring by having the switch that wants to share the management information and/or network forwarding information transmit one or more corresponding packets out one of its stacked ports 144 with each of the other switches 110A-110N in the ring forwarding the packets until the initial switch receives the packets back after the packets are forwarded around the ring.

In some embodiments, management of stacked switch 115 may be largely consolidated in one of the switches 110A-110N, which is often referred to as the master switch for stacked switch 115. In some embodiments, the master switch may be the only one of the switches 110A-110N coupled to management network 170 because of the ability of the switches 110A-110N to exchange management information using the stacked ports 144. In some examples, a second switch of the switches 110A-110N may also be coupled to management network 170 when a redundant connection to management network 170 is desired.

The process of selecting the master switch is often referred to as election of the master switch. Once elected, the master switch may take over primary responsibility for managing stacked switch 115 as a whole and/or providing management and/or other information to the other switches 110A-110N in stacked switch 115. In some examples, the master switch may begin acting as the master switch by forwarding notice of its election to the other switches 110A-110N in stacked switch 115 using the ring of stacked ports 144 and network links 160. Several approaches are possible for handling the master switch election process.

In some embodiments, the election of the master switch may be taken care of as part of the initial configuration and/or provisioning of switches 110A-110N. In some examples, the initial configuration and/or provisioning received by one of the switches 110A-110N may include an indicator that the corresponding switch 110A-110N is to be the master switch. In some examples, the indicator may be received from the network administrator using management console 180. In some examples, the indicator may be received as part of a configuration and/or provisioning script or record received during the configuration and/or provisioning process. In some examples, election of the master switch by the initial configuration and/or provisioning may fail when more than one of the switches 110A-110N receives the indicator that they are to be the master switch.

In some embodiments, a more dynamic process may be used to elect the master switch. In some examples, the election process may be designed so that ties are not possible and just one of the switches 110A-110N is elected as the master switch. In some examples, identifiers that uniquely identify each of the switches 110A-110N may be exchanged among the switches 110A-110N with the switch 110A-110N with the highest or the lowest identifier being elected as the master switch. In some examples, suitable identifiers may be the medium access control (MAC) addresses uniquely assigned by manufacturers to each of the switches 110A-110N. In some examples, a hybrid approach may be used where priority settings may be assigned to one or more of the switches during initial configuration and/or provisioning. In some examples, the priority settings may be used in a first round of the election process with the unique identifiers being used to break any remaining ties from among the switches 110A-110N with a same highest priority setting.

As discussed above and further emphasized here, FIG. 1 is merely an example which should not unduly limit the scope of the claims. One of ordinary skill in the art would recognize many variations, alternatives, and modifications. In some embodiments, other topologies and/or arrangements of the switches 110A-110N in stacked switch 115 are possible.

Figure 2:
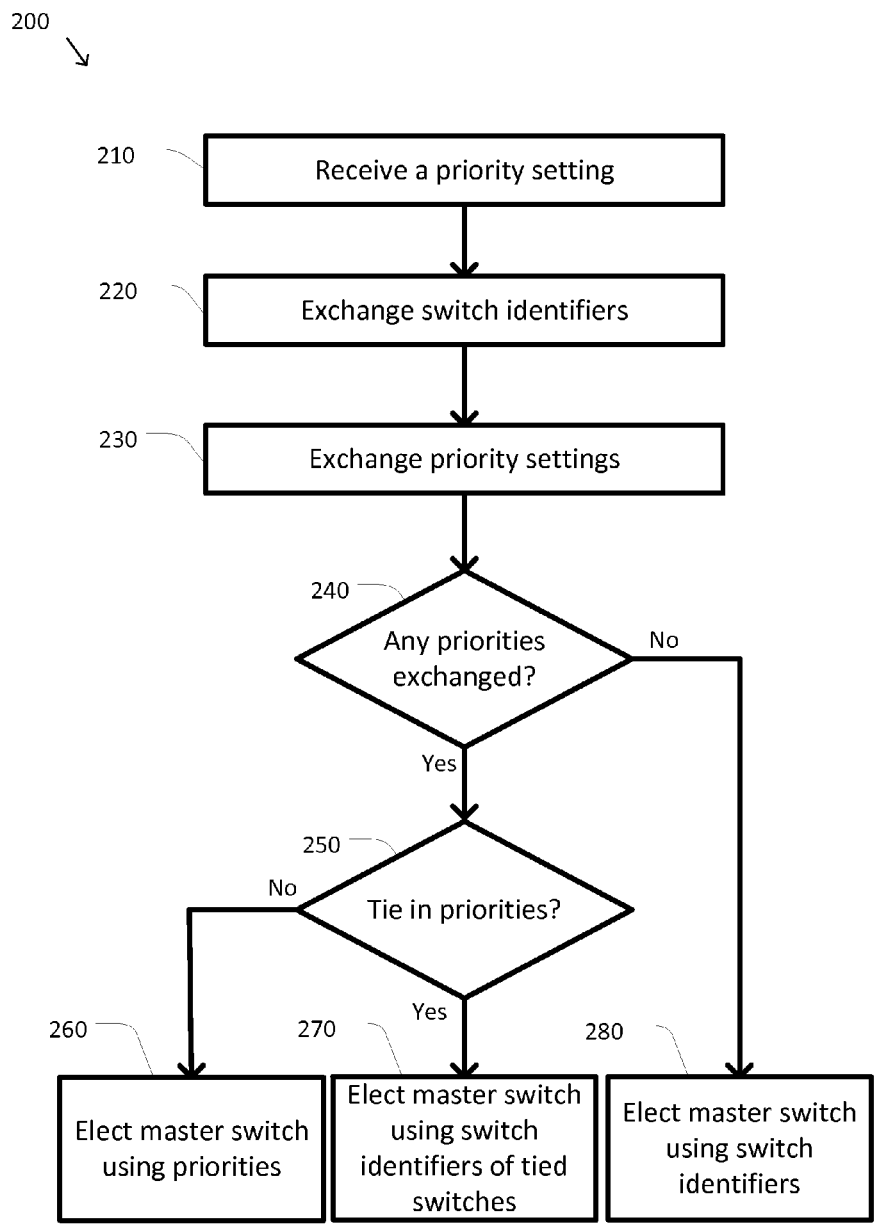
FIG. 2 is a simplified diagram of a method for electing a master switch according to some embodiments.

FIG. 2 is a simplified diagram of a method 200 for electing a master switch according to some embodiments. In some embodiments, one or more of the processes 210-280 of method 200 may be implemented, at least in part, in the form of executable code stored on non-transient, tangible, machine readable media that when run by one or more processors (e.g., the one or more processors of control units 120A-120N) may cause the one or more processors to perform one or more of the processes 210-280. In some embodiments, method 200 may be performed in a switch, such as any of the switches 110A-110N. In some embodiments, method 200 may be performed by each of the switches in a stacked switch, such as stacked switch 115. In some embodiments, one or more of processes 210 and/or 230 are optional and may be omitted.

At an optional process 210, a switch may receive a priority setting. In some examples, the switch may be any of the switches 110A-110N. In some examples, the switch may receive the priority setting during initial configuration and/or provisioning. In some examples, the switch may receive the priority setting from an operator, a configuration script, and/or the like. In some examples, the priority may be a number selected from a range of numbers (e.g., 0-M), a set of priority levels (e.g., high, medium, and low), and/or the like. In some examples, the range of numbers may associate the highest priority with 0 or the highest priority with M.

At a process 220, switch identifiers are exchanged. To help identify the switches in a stacked switch, the switch exchanges its own switch identifier with the other switches in the stacked switch. In some examples, the switch identifier may be a unique identifier assigned to the switch. In some examples, the switch identifier may be a MAC address and/or other layer 2 address for the switch. In some examples, the switch may share its switch identifier with the other switches by sending one or more messages to the other switches via one or more of the stacking ports of the switch. In some examples, the one or more messages may be messages in a stacking protocol used by the switch and the other switches in the stacked switch. In some examples, the one or more messages may include corresponding headers with a field for communicating the switch identifier. In some examples, the one or more messages may include a corresponding type-length-value (TLV) field for communicating the switch identifier.

During process 220, the switch also receives switch identifiers from the other switches in the stacked switch. In some examples, the switch identifiers of the other switches may be received in one or more messages received on the stacking ports of the switch. In some examples, the switch identifiers may be included in the one or more messages in header fields, TLVs, and/or the like. In some examples, the switch may record the switch identifiers for each of the other switches in the stacked switch in one or more data structures. In some embodiments, and depending on the topology of the stacked switch, the switch may also forward the one or more messages onto others of the switches in stacked switch using one or more of the stacking ports of the switch. For example, in the topology of stacked switch 115 in FIG. 1, each of the switches 110A-110N is responsible for forwarding each of the messages with a switch identifier that the switch 110A-110N receives until the messages are forwarded all the way around the ring. In this way, each of the switches 110A-110N receives at least one message containing the switch identifier of each of the switches 110A-110N.

At an optional process 230, the priority settings are exchanged. To help share the priority settings received by each switch in the stacked switch during a respective process 210, the switch exchanges its own priority setting with the other switches in the stacked switch. In some examples, the switch may exchange its priority setting, receive the priority setting of other switches in the stacked switch, and/or forward the priority setting of the other switches using mechanisms similar to those used to exchange the switch identifiers during process 220. In some examples, the switch may record the priority settings for each of the other switches in the stacked switch in one or more data structures. In some examples, only some of the switches in the stacked switch may have received a priority setting during process 210, so it is possible that the switch may not receive a priority setting for each of the other switches in the stacked switch.

At a process 240, it is determined whether any priority settings were exchanged during process 230. As the switch performs process 230, the switch may keep track of whether any messages, header fields, TLVs, and/or the like are received containing priority settings of the other switches in the stacked switch. In some examples, the switch may determine whether any priority settings were exchanged during process 230 by determining whether the one or more data structures for recording priority settings are empty. When at least one priority setting was exchanged, the priority settings are examined beginning with a process 250. When no priority settings were exchanged, the switch master is elected using a process 280.

At the process 250, it is determined whether there is a tie in the priority settings. When priority settings are assigned to one or more of the switches in the stacked switch, the master switch is elected based on the switch with the highest priority setting. In some examples, when two or more switches have a tie in the highest priority setting, some other tie breaker is used to elect the master switch so that only one master switch is elected. When just one switch has the highest priority setting, that one switch is elected as the master switch during a process 260. When two or more switches have the same highest priority setting, the master switch is elected from among those switches using a process 270.

At the process 260, the master switch is elected using the priority settings. The switch with the highest priority setting exchanged during process 230 is elected as the master switch. In some examples, the switch may determine the switch with the highest priority setting by comparing each of the priority settings recorded in the one or more data structures. Each of the switches in the stacked switch may elect the same master switch because each of the switches received the priority settings for each of the other switches during process 230 and may thus reach the same conclusion regarding which of the switches is to be elected as the master switch.

At the process 270, the master switch is elected using the switch identifiers of the switches having the same highest priority setting. In some examples, the switch identifiers of the switches having the same highest priority setting and exchanged during process 220 may be compared to determine the switch with the highest (or alternatively the lowest) switch identifier. Because the switch identifiers should be unique, the switch with the highest (or alternatively the lowest) switch identifier may be uniquely identified and elected as the master switch. Each of the switches in the stacked switch may elect the same master switch because each of the switches received the switch identifiers for each of the other switches during process 220 and received the priority settings for each of the other switches during process 230 and may thus reach the same conclusion regarding which of the switches is to be elected as the master switch.

At the process 280, the master switch is elected using the switch identifiers. In some examples, the switch identifiers of the switches exchanged during process 220 may be compared to determine the switch with the highest (or alternatively the lowest) switch identifier. Because the switch identifiers should be unique, the switch with the highest (or alternatively the lowest) switch identifier may be uniquely identified and elected as the master switch. Each of the switches in the stacked switch may elect the same master switch because each of the switches received the switch identifiers for each of the other switches during process 220 and may thus reach the same conclusion regarding which of the switches is to be elected as the master switch.

As discussed above and further emphasized here, FIG. 2 is merely an example which should not unduly limit the scope of the claims. One of ordinary skill in the art would recognize many variations, alternatives, and modifications. In some embodiments, method 200 may be performed for a limited time after the switch is rebooted and/or reset. In some examples, the limited time may be limited to a time period of anywhere from ten seconds to two minutes or longer. In some embodiments, processes 220 and 230 may be combined into a single process where both the switch identifiers and the priority settings are exchanged is the same messages, headers, and/or TLVs. In some examples, the messages and/or headers exchanged may include multiple TLVs depending on whether priority settings and/or switch identifiers are exchanged.

While the mechanisms of method 200 are sufficient so that each of the switches in the stacked switch may elect the same master switch, the criteria used may not elect the most appropriate switch as the master switch. In some examples, the use of the switch identifier to elect the master switch during processes 270 and 280 results in the master switch being elected almost arbitrarily without regard to which of the switches in the stacked switch is best able to handle the duties of the master switch as the switch identifiers generally don't account for variations in the models of the switches, the locations of the switches in the stacked switch, the connectivity, or lack thereof, of the switches to the management network, and/or the like. In some examples, the use of the priority settings may help elect a better master switch, but the priority settings given to the switches may be relatively statically assigned and may not account for changes in the stacked switch, such as the addition, removal, change, or update of one or more of the switches in the network and/or the connectivity of the network links coupling the stacked ports and/or the management ports. Accordingly, more dynamic mechanisms for electing a master switch may be desirable.

Figure 3:
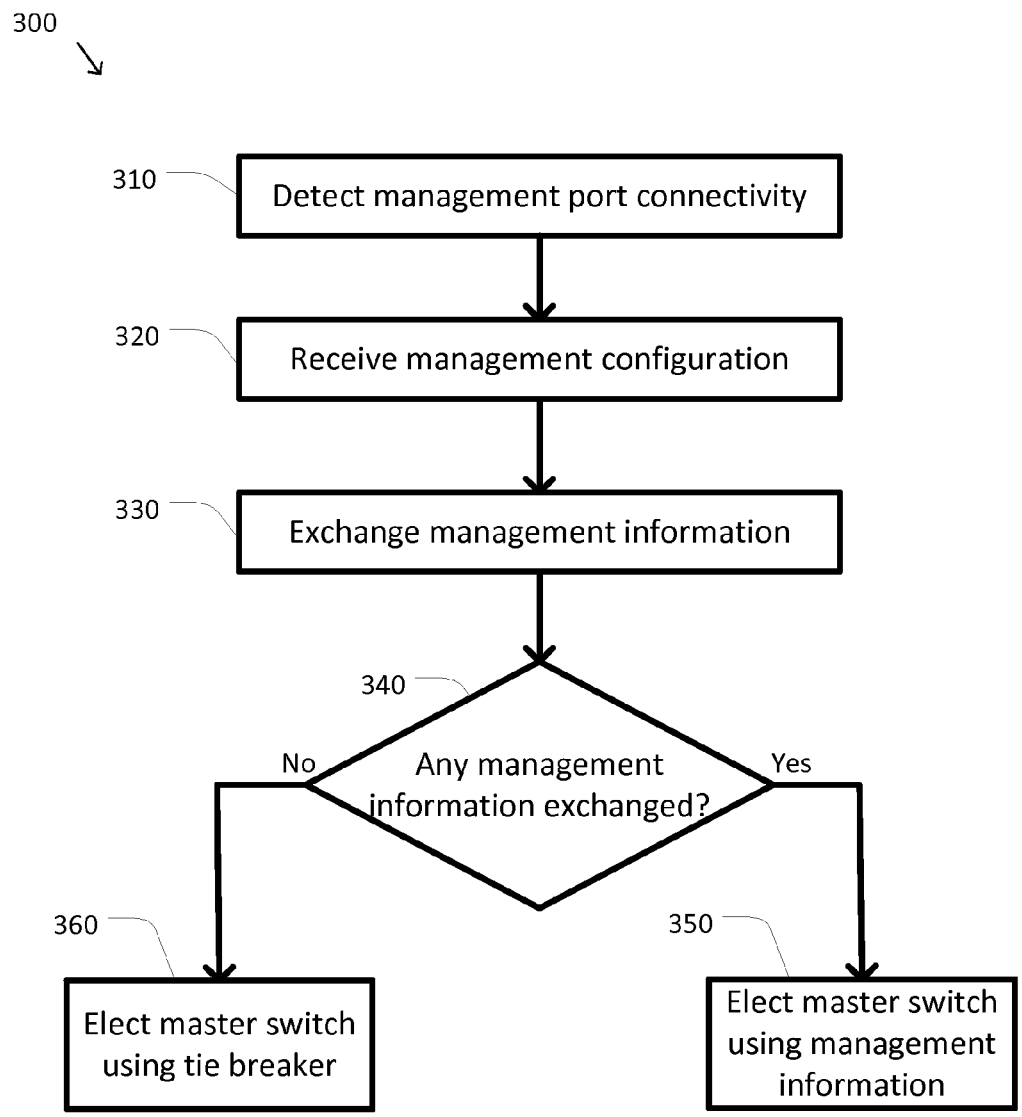
FIG. 3 is a simplified diagram of another method for electing a master switch according to some embodiments.

FIG. 3 is a simplified diagram of another method 300 for electing a master switch according to some embodiments. In some embodiments, one or more of the processes 310-350 of method 300 may be implemented, at least in part, in the form of executable code stored on non-transient, tangible, machine readable media that when run by one or more processors (e.g., the one or more processors of control units 120A-120N) may cause the one or more processors to perform one or more of the processes 310-350. In some embodiments, method 300 may be performed in a switch, such as any of the switches 110A-110N. In some embodiments, method 200 may be performed by each of the switches in a stacked switch, such as stacked switch 115. In some embodiments, process 320 is optional and may be omitted.

At a process 310, management port connectivity is determined. In some examples, a switch may determine that it has management port connectivity by detecting the presence of a network link and/or a cable coupled to a management port of the switch. In some examples, the switch may monitor network traffic the switch receives on one or more of its management ports to determine one or more connectivity settings for the management ports. For example, when the switch is one of the switches 110A-110N, the switch may monitor the network traffic received on one or more of the management ports 146. In some examples, the switch may determine whether it is receiving any management information over its management ports. In some examples, the switch may determine a connection speed (e.g., in megabits or gigabits per second) of the one or more management ports by using one or more application programming interface (API) calls of a driver for the management ports, interrogating a driver circuit for the management ports, measuring an amount of network traffic on the management ports over a known period of time, and/or the like. In some examples, the connection speed may indicate an amount of network traffic that may be handled by the management ports. In some examples, a switch having a higher connection speed for its management ports may make a better candidate for the master switch due to the ability of that switch to receive more configuration and/or management information from a network operator and/or a server, such as a DHCP server. In some examples, the switch may determine whether its management ports are half duplex (e.g., only able to receive information) or full duplex (e.g., able to transmit and receive information). In some examples, the switch may determine whether the management ports are half or full duplex using one or more API calls and/or interrogating the driver circuit. A switch having management ports with full duplex may make a better candidate for the master switch than a switch having management ports with half duplex. In some embodiments, other connectivity indicators of the management ports may be determined as well.

At an optional process 320, management configuration may be received. In some examples, when the switch has connectivity to the management network via one or more of its management ports, the switch may receive management configuration information from the network operator and/or a server, such as a DHCP server. In some examples, the management configuration may include an Internet Protocol (IP) address for the switch and/or the stacked switch. In some examples, a switch receiving management configuration information, such as an IP address may have better connectivity with the management network than other switches in the stacked switch.

At a process 330, management information is exchanged. Similar to method 200, any management information to be used by the switches during the master switch election process is exchanged with the other switches in the stacked switch. In some examples, the management information may include the management port connectivity, presence of a management port connection, management port speed, management port duplex, and/or the like detected during process 310 and/or the management configuration information, IP address assignment, and/or the like received during process 320. Similar to processes 220 and/or 230, the management port information may be exchanged with the other switches in the stacked switch using one or more messages, header fields, TLVs, and/or the like with corresponding messages, header fields, and/or TLVs being exchanged for each type of management information. Additionally, management information received from another switch in the stacked switch may be forwarded to the other switches in the stacked switch. In some examples, the exchanged management information may be stored in one or more data structures by the switch.

At a process 340, it is determined whether any management information was exchanged by the switch during process 330. As the switch performs process 330, the switch may keep track of whether any management information, such as management port connectivity, presence of a management port connection, management port speed, management port duplex, management configuration information, IP address assignment, and/or the like for the switch and/or the other switches in the stacked switch were exchanged during process 330. In some examples, the switch may determine whether any management information was exchanged during process 330 by determining whether the one or more data structures for recording management information are empty. When any management information was exchanged, the master switch is elected using the management information in a process 350. When no management information was exchanged, the switch master is elected using a tie breaker in a process 360.

At the process 350, the master switch is elected using the management information. In some examples, the master switch is elected from among the switches for which management information was exchanged during process 330. In some examples, the management port connectivity, presence of a management port connection, management port speed, management port duplex, management configuration information, IP address assignment, and/or the like for the switches that have any of this management information may be considered during the switch election process. In some examples, the different types of management information may be considered in a predetermined order so that certain types of management information are given precedence over other types of management information while electing the master switch. In some examples, management configuration information may be considered first. When just one switch has been assigned an IP address, then that switch is elected as the master switch. When more than one switch has been assigned an IP address, the master switch is elected from among those switches and/or when no switch has been assigned an IP address, the master switch is elected from among each of the switches in the stacked switch, using a second criterion. In some examples, the second criterion may be the presence of a management port connection and/or management port speed, with the switch having the highest management port speed from among the switches having a management port connection being elected the master switch. When more than one switch has the same highest management port speed and/or management port speed is not known for any of the switches, then the management port duplex is used with full duplex being given precedence over half duplex. In some examples, when after considering the management information for the switches a tie still exists, then an additional tie breaking process, such as the process 360, may be used to elect the master switch from among the switches having the tie. As with method 200, each of the switches in the stacked switch may elect the same master switch because each of the switches received the management information for each of the other switches during process 330 and may thus reach the same conclusion regarding which of the switches is to be elected as the master switch.

At the process 360, the master switch is elected using a tie breaker. When no management information is exchanged during process 330 and/or process 350 is unable to elect a master switch, the master switch is elected using a tie breaking procedure. In some examples, the time breaking procedure may be the tie breaking of method 200 where switch priority setting and then switch identifiers may be used to elect the master switch.

As discussed above and further emphasized here, FIG. 3 is merely an example which should not unduly limit the scope of the claims. One of ordinary skill in the art would recognize many variations, alternatives, and modifications. In some embodiments, method 300 may be performed for a limited time after the switch is rebooted and/or reset. In some examples, the limited time may be limited to a time period of anywhere from ten seconds to two minutes or longer. In some embodiments, the tie breaking information (e.g., switch priority settings and/or switch identifiers) used during process 360 may be exchanged along with management information exchanged during process 330. In some examples, the management information, priority settings, and/or switch identifiers may be exchanged together using the same messages, headers, and/or TLVs. In some examples, the messages and/or headers exchanged may include corresponding TLVs for each type of management information, priority settings, and/or switch identifiers exchanged.

Some embodiments of switches 110A-110N may include non-transient, tangible, machine readable media that include executable code that when run by one or more processors (e.g., one or more processors in control units 120A-120N) may cause the one or more processors to perform the processes of methods 200 and/or 300 as described above. Some common forms of machine readable media that may include the processes of methods 200 and/or 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A network switching device, the device comprising:
   a management port for coupling the device to a management system;
   a plurality of stacking ports for coupling the device to other network switching devices in a stacked switch; and
   a control unit coupled to the management port and the stacking ports;
   wherein the control unit:
      detects one or more first connectivity settings of the management port, the one or more first connectivity settings including one or more of a management port connection, a connection speed, and a duplex setting of the management port;
      sends the first connectivity settings to the other network switching devices using at least one of the stacking ports;
      receives second connectivity settings for the other network switching devices using the stacking ports, the second connectivity settings including one or more of a management port connection, a connection speed, and a duplex setting of respective management ports of the other network switching devices; and
      elects a master network switching device for the stacked switch based on the first and second connectivity settings.

2. The device of claim 1, wherein the control unit elects the master network switching device based on which of the device and the other network switching devices having a respective management port connection has a highest connection speed for its respective management port.

3. The device of claim 1, wherein the control unit elects the master network switching device based on which of the device and the other network switching devices has a full duplex setting for its respective management port instead of a half duplex setting.

4. The device of claim 1, wherein the control unit further:
   exchanges switch identifiers of the device and the other network switching devices using the stacking ports; and
   when the control unit cannot elect the master network switching device based on the first and second connectivity settings, the control unit elects the master network switching device based on a tie-breaking procedure using the exchanged switch identifiers.

5. The device of claim 4, wherein the switch identifiers are medium access control addresses of the device and the other network switching devices.

6. The device of claim 1, wherein the control unit further:
   receives the second connectivity settings on a first one of the stacking ports; and
   transmits the second connectivity settings on a second one of the stacking ports.

7. The device of claim 1, wherein:
   the control unit further:
      receives a first management configuration from the management system;
      sends the first management configuration to the other network switching devices using at least one of the stacking ports; and
      receives second management configurations of the other network switching devices using the stacking ports; and
   the election of the master network switching device is further based on the first and second management configurations.

8. The device of claim 7, wherein the first management configuration includes an Internet protocol (IP) address for the device.

9. A method of electing a master network switching device, the method comprising:
   detecting one or more first connectivity settings of a management port, the management port coupling a first network switching device to a management system, the one or more first connectivity settings including one or more of a management port connection, a connection speed, and a duplex setting of the management port;
   sending the first connectivity settings to other network switching devices in a stacked switch using at least one of a plurality of stacking ports, the stacking ports coupling the first network switching device to the other network switching devices;
   receiving second connectivity settings for the other network switching devices using the stacking ports, the second connectivity settings including one or more of a management port connection, a connection speed, and a duplex setting of respective management ports of the other network switching devices; and
   electing a master network switching device for the stacked switch based on the first and second connectivity settings.

10. The method of claim 9, wherein electing the master network switching device comprises electing the master network switching device based on which of the first network switching device and the other network switching devices having a respective management port connection has a highest connection speed for its respective management port.

11. The method of claim 9, wherein electing the master network switching device comprises electing the master network switching device based on which of the first network switching device and the other network switching devices has a full duplex setting for its respective management port instead of a half duplex setting.

12. The method of claim 9, further comprising:
exchanging switch identifiers of the first network switching device and the other network switching devices using the stacking ports; and
when the master network switching device cannot be elected based on the first and second connectivity settings, electing the master network switching device based on a tie-breaking procedure using the exchanged switch identifiers.

13. The method of claim 12, wherein the switch identifiers are medium access control addresses of the first network switching device and the other network switching devices.

14. The method of claim 9, further comprising:
receiving the second connectivity settings on a first one of the stacking ports; and
transmitting the second connectivity settings on a second one of the stacking ports.

15. The method of claim 9, further comprising:
receiving a first management configuration from the management system;
sending the first management configuration to the other network switching devices using at least one of the stacking ports; and
receiving second management configurations of the other network switching devices using the stacking ports;
wherein the electing of the master network switching device is further based on the first and second management configurations;
wherein the first management configuration includes an Internet protocol (IP) address for the first network switching device.

16. An information handling system comprising:
a stacked switch comprising a plurality of network switching devices, each of the network switching devices comprising:
a management port for coupling the network switching device to a management system;
a plurality of stacking ports for coupling the network switching device to others of the network switching devices in the stacked switch; and
a control unit coupled to the management port and the stacking ports;
wherein the control unit:
detects one or more first connectivity settings of the management port, the one or more first connectivity settings including one or more of a management port connection, a connection speed, and a duplex setting of the management port;
sends the first connectivity settings to the others of the network switching devices in the stacked switch using at least one of the stacking ports;
receives second connectivity settings for the others of the network switching devices in the stacked switch using the stacking ports, the second connectivity settings including one or more of a management port connection, a connection speed, and a duplex setting of respective management ports of the others of the network switching devices; and
elects a master network switching device for the stacked switch based on the first and second connectivity settings.

17. The information handling system of claim 16, wherein:
the control unit further:
receives a first management configuration from the management system;
sends the first management configuration to the others of the network switching devices in the stacked switch using at least one of the stacking ports; and
receives second management configurations of the others of the network switching devices in the stacked switch using the stacking ports;
the election of the master network switching device is further based on the first and second management configurations; and
the first management configuration includes an Internet protocol (IP) address for the network switching device.

18. The information handling system of claim 16, wherein the control unit elects the master network switching device based on which of the network switching devices in the stacked switch having a respective management port connection has a highest connection speed for its respective management port.

19. The information handling system of claim 16, wherein the control unit further:
exchanges switch identifiers of the network switching devices in the stacked switch using the stacking ports; and
when the control unit cannot elect the master network switching device based on the first and second connectivity settings, the control unit elects the master network switching device based on a tie-breaking procedure using the exchanged switch identifiers.

* * * * *